H. WHEELER.
SIGNAL LAMP.
APPLICATION FILED AUG. 11, 1908.
932,207.
Patented Aug. 24, 1909.
2 SHEETS—SHEET 1.
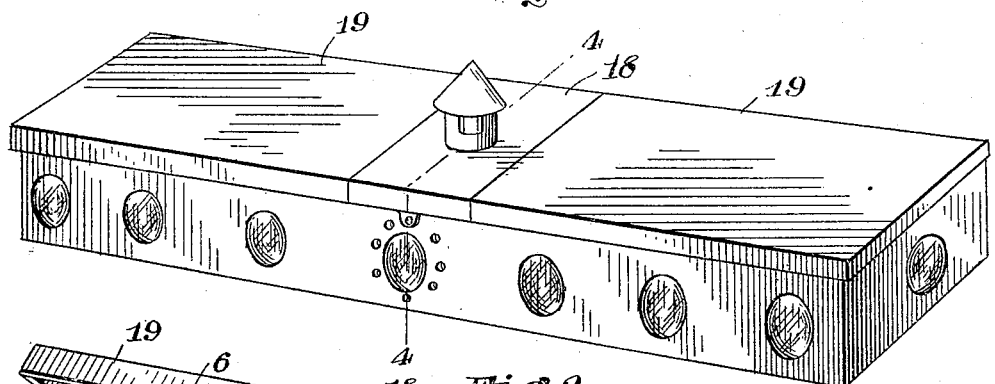
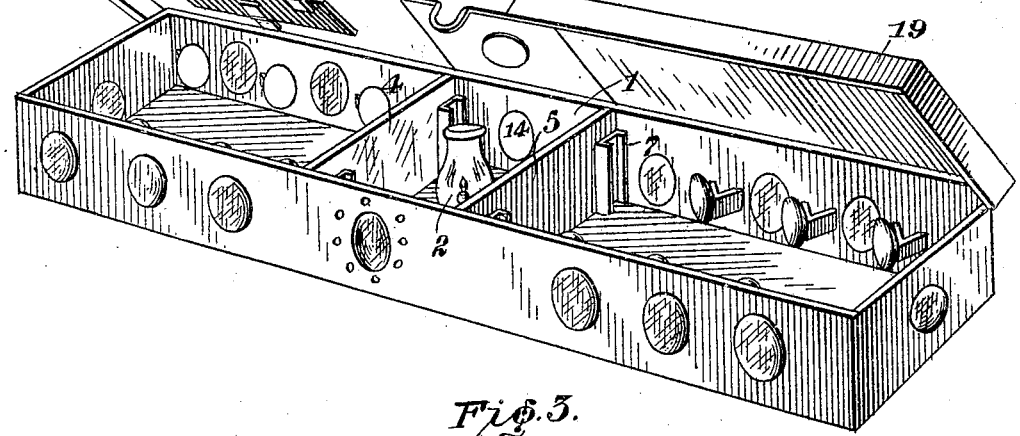
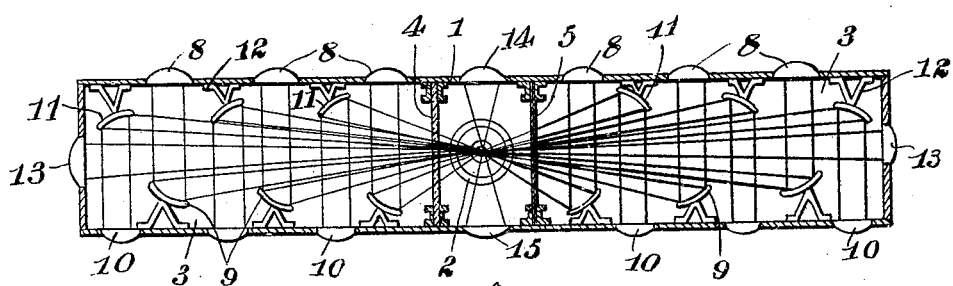
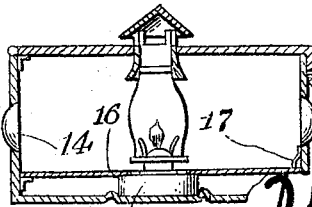
Inventor
Horace Wheeler,
Witnesses H. WHEELER.
SIGNAL LAMP.
APPLICATION FILED AUG. 11, 1908.
932,207.
Patented Aug. 24, 1909.
2 SHEETS—SHEET 2.
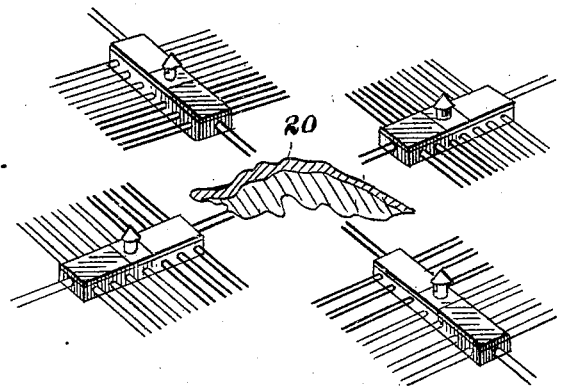
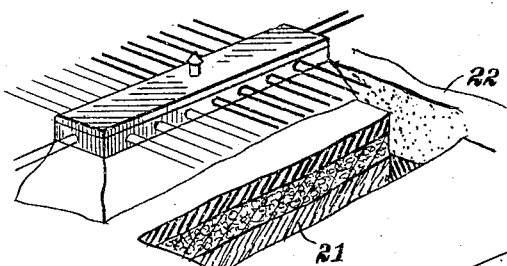
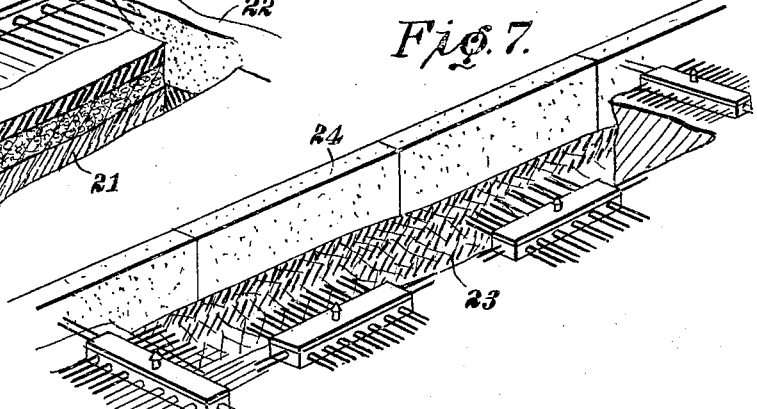
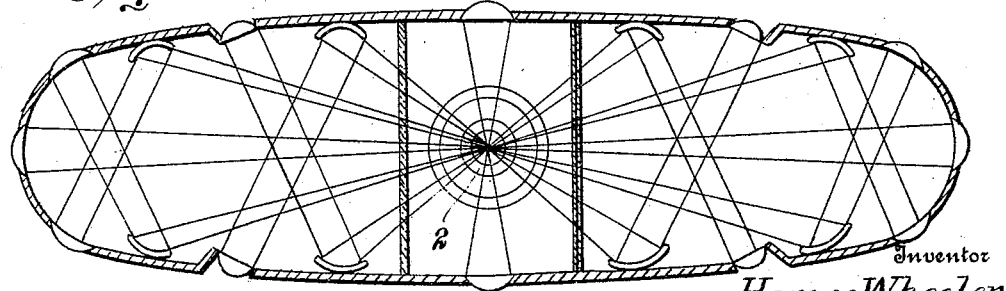
Inventor
Horace Wheeler;

UNITED STATES PATENT OFFICE.

HORACE WHEELER, OF HARTFORD, CONNECTICUT.

SIGNAL-LAMP.

932,207.

Specification of Letters Patent. Patented Aug. 24, 1909.

Application filed August 11, 1908. Serial No. 448,007.

*To all whom it may concern:*

Be it known that I, HORACE WHEELER, citizen of the United States, residing at Hartford, in the county of Hartford and State of Connecticut, have invented certain new and useful Improvements in Signal-Lamps, of which the following is a specification.

The invention is designed to provide a novel form of signal for use at night in connection with street or highway obstructions and openings which shall indicate by a difference in the color of light rays thrown, upon which side of an obstruction or opening the passage-way is clear.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a signal lamp embodying the invention. Fig. 2 is a perspective view of the lamp, the cover being partly open. Fig. 3 is a horizontal section. Fig. 4 is a transverse section on the line 4—4 of Fig. 1. Figs. 5, 6 and 7 show different applications of the invention. Fig. 8 is a horizontal section of a modification.

Corresponding and like parts are referred to in the following description and indicated in all the views of the drawings by the same reference characters.

The lamp comprises a casing which is oblong and comparatively shallow and closed at its bottom, ends and sides and open at the top, a cover being provided for closing the open top. The casing is subdivided by partitions to form a middle and end boxes, each box being closed at its top by a separate cover, thereby admitting of access being had to any one of the boxes without disturbing the covers of the others. The middle box 1 is designated as the light box because it contains the illuminator 2. The end boxes 3 are designated as reflector boxes, since they contain the reflectors by means of which the rays of light are directed through the lenses located in the sides of the casing. The partitions 4 and 5 consist of transparent plates, preferably of glass, the same being of a color according to the light to be thrown. The plates 4 and 5 are removable so that the desired color may be placed in position according to the nature of the light to be thrown. Extra plates may be provided which for convenience are held in place upon the inner side of a cover to a reflector box by means of clips 6. Suitable guides 7 are arranged at opposite sides of the casing to receive and hold the partitions or transparent plates in position, said guides preferably consisting of spring or flexible strips soldered or otherwise attached to the walls of the casing.

A series of lenses 8 is located along one side of the reflector boxes and a corresponding series of reflectors 9 is arranged upon the inner wall of the opposite side of the reflector boxes to throw the rays of light from the lamp through the lenses 8. The series of reflectors 9 has a progressive or echelon arrangement so as to gather the rays of light from the illuminator and direct the same through the respective lenses. A series of lenses 10 is provided in the opposite wall of the reflector boxes and a corresponding series of reflectors 11 is located upon the inner wall of the reflector boxes opposite to the lenses 10 to direct the rays of light therethrough. The series of reflectors 11 has a progressive or echelon arrangement similar to the series of reflectors 9 and for a like purpose. The lenses 8 upon one side of the reflector boxes have a staggered arrangement with reference to the lenses 10 of the opposite side and the reflectors 9 and 11 also have a staggered arrangement. Brackets 12 support the reflectors and are attached to the inner walls of the reflector boxes, said brackets progressively increasing in length from the inner to the outer end of the reflector boxes. A lens 13 is located in the outer end of each reflector box and receives the rays of light direct from the lamp. Other lenses 14 and 15 are provided in the sides of the light box and may be of the same or different colors. The several lenses 8, 10 and 13 may be white but the rays of light directed therethrough may be of a color depending upon the nature of the plate 4 or 5 placed in position. If the plate 4 is white and the plate 5 ruby, the light thrown through the lenses of one reflector box will be white and that thrown through the lenses of the other box red.

The illuminator 2 is prevented from shifting by being fitted in a seat provided in the bottom of the casing and formed by stamping a rib upward in said bottom. A false floor 16 is hinged at one edge to a side of the light box and after being closed down upon the illuminator 2, is held at its opposite edge by means of a catch 17. The cover 18 of the light box is provided with a ventilator to afford an escape for the hot air passing off from the illuminator. Openings are formed in opposite sides of the light box to admit sufficient air for supporting combustion when the lamp is burning. The cover 18 may be secured when closed by any suitable fastening means. The covers 19 of the reflector boxes are likewise hinged at one side and fit close when lowered so as to exclude dust from the reflector boxes.

The casing of the lamp, as shown in Figs. 1, 2 and 3, is oblong and rectangular. This form, however, is not essential. In Fig. 8 the casing is oval in outline, thereby avoiding the necessity of providing brackets 12 for supporting the several reflectors, the latter being attached directly to the inner walls of the reflector boxes, the curvature being such as to give the proper set to the reflectors to insure their gathering the rays of light from the lamp and directing said light rays through the respective lenses. The arrangement of the remaining parts is substantially the same as herein stated.

In Fig. 5 an opening 20 is shown in the surface of a street and a series of signal lamps embodying the invention is arranged about the same, the lamps being positioned so that the red rays are adjacent to the opening to indicate danger and the white rays facing outward or away from the opening to indicate that the passage-way in that direction is clear. In Fig. 6 an opening 21 is shown in the surface adjacent to a line of curbing 22. The signal lamp placed at one side of the opening is arranged so that the red rays are adjacent the line of curbing 22, thereby indicating danger in this direction, the white rays being away from the line of curbing to indicate that the passage-way in this direction is safe. Fig. 7 shows an excavation 23 at one side of a line of curbing 24. The lamps placed at the ends of the excavation 23 throw red rays from their ends adjacent the line of curbing to indicate danger and white rays at the ends away from said line of curbing to indicate that the passage-way is clear. The lamps at the side of the excavation are adapted so as to throw red light from all the lenses to give warning of danger. It is to be understood that the nature of the light thrown depends upon the color of the plates 4 or 5, and if both plates are ruby the light thrown from the lenses of the reflector boxes will be red and if the plates are clear the light shed through the lenses of the reflector boxes will be white. By placing different color plates in position, the light at one end of the casing will be different from the light thrown through the lenses at the opposite end of the casing. It will thus be understood that any color of light may be thrown to meet varying conditions.

Having thus described the invention, what is claimed as new is:

1. In a signal lamp, the combination of a casing having a series of lenses along opposite sides, the lenses upon one side being arranged opposite the spaces between the lenses upon the opposite side, an illuminator, and a series of reflectors upon opposite sides of the casing and arranged between the lenses, whereby the reflectors upon opposite sides have a staggered arrangement.

2. A signal lamp comprising a reflector box provided at one end and along opposite sides with lenses, a translucent plate forming a closure for the opposite end of the box, an illuminator spaced from the translucent plate, reflectors ranged along opposite sides of the box intermediate of the lenses, the reflectors at one side of the box being arranged to direct the rays of light from the illuminator through the lenses at the opposite side of the box, said translucent plate being adapted to change the color of the light as may be required.

3. In a signal lamp, a light box, reflector boxes at opposite sides of the light box, each reflector box having a series of lenses along its sides, and coöperating reflectors, the latter being arranged between the lenses upon the same side and having a progressive arrangement to direct rays of light through the several lenses, and plates separating the light box from the reflector box and adapted to change the color of the light as may be required.

In testimony whereof I affix my signature in presence of two witnesses.

HORACE WHEELER. [L. S.]

Witnesses:
ALFRED P. RENWOOD,
F. W. BANISTER.